Oct. 7, 1952 W. R. STONE 2,613,295
RAIN-CONTROLLED SWITCH FOR CONVERTIBLE TOP AUTOMOBILES
Filed Nov. 24, 1950
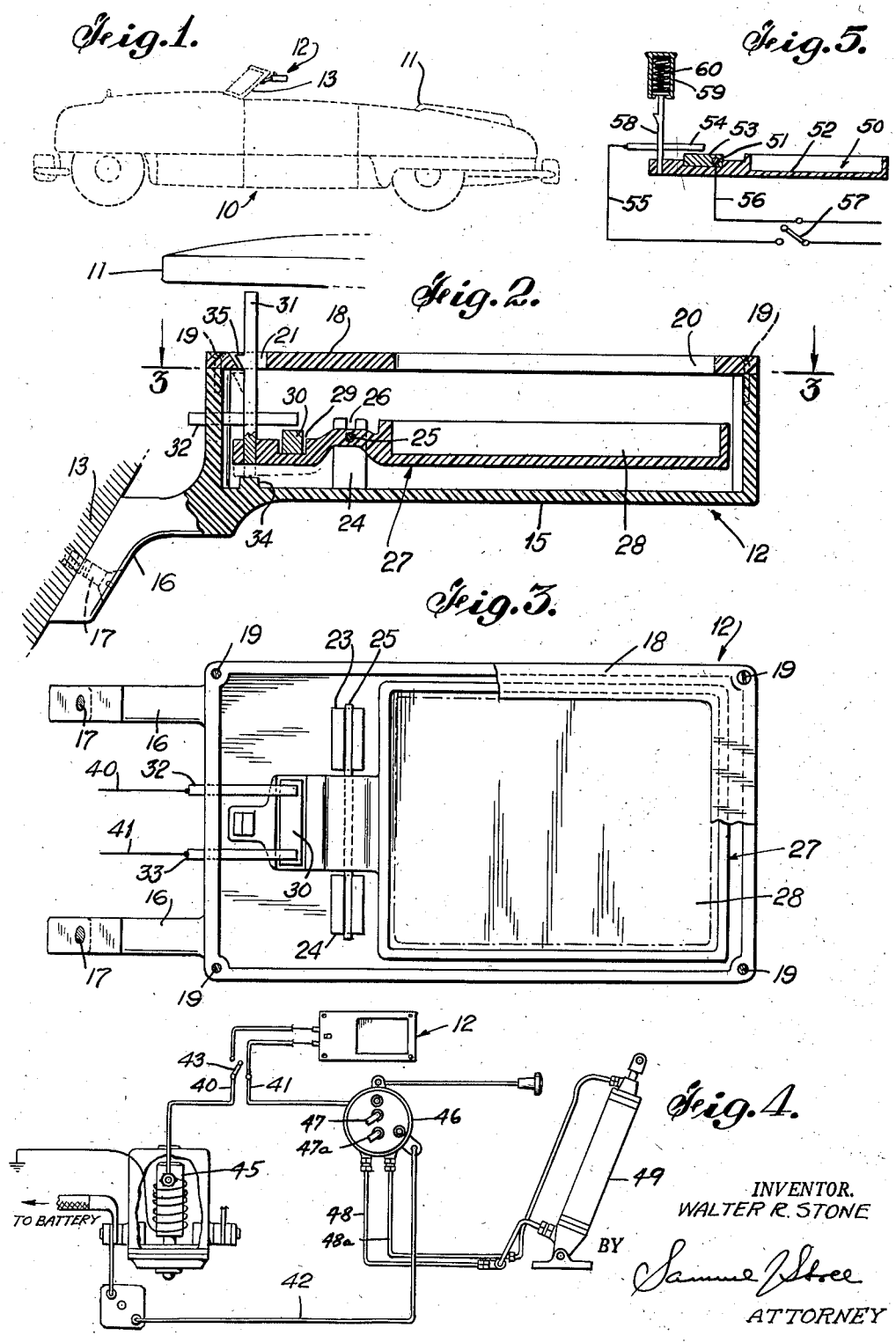
INVENTOR.
WALTER R. STONE
BY
ATTORNEY Patented Oct. 7, 1952

2,613,295

UNITED STATES PATENT OFFICE 2,613,295

RAIN-CONTROLLED SWITCH FOR CONVERTIBLE TOP AUTOMOBILES

Walter R. Stone, Mount Vernon, N. Y.

Application November 24, 1950, Serial No. 197,214

2 Claims. (Cl. 200—85)

This invention relates to a rain-controlled switch for convertible top automobiles in which hydraulic means is provided to raise and lower the convertible top.

The modern convertible top automobile is provided with a hydraulic mechanism for actuating the convertible top. This hydraulic mechanism is operated and controlled by means of an electric motor which receives its current from the storage battery of the automobile. A manually operated switch is installed for opening and closing the electric circuit. In some of the more expensive automobiles similar hydraulic apparatus is provided to raise and lower the windows.

It frequently happens that a convertible top automobile is left in a parking space with its convertible top in lowered or open position. A sudden downpour of rain enters the automobile and causes damage to the upholstered seats and the seat covers, as well as to the floor covering. It is the principal object of this invention to provide a rain-controlled switch for automatically actuating the hydraulic mechanism of the convertible top in time of rain. This switch is so designed that the first few drops of rain will have the effect of actuating the switch and closing the circuit. The hydraulic mechanism then raises the convertible top in conventional manner and by conventional means. When the convertible top is in raised or closed position, it engages the rain-controlled switch and actuates the switch to open the circuit. The hydraulic mechanism is thereby caused to cease operating. The same rain-controlled switch may be connected to the electric circuits which control the window actuating hydraulic apparatus in order to close the windows automatically in time of rain.

It appears that rain actuated switches have heretofore been developed to actuate the windows in private homes. In some cases the rain-controlled switch is provided with a contact member mounted on a float. When a sufficient quantity of rain falls to support the float, a circuit is closed and the window closing apparatus is put into operation. This device is hardly feasible for convertible top automobiles for the reason that the quantity of rain required to actuate the switch is amply sufficient to cause damage to the seats, seat covers and floor covering of the automobile. The prior art also includes rain-controlled switches for private homes wherein a water soluble element is provided. When this element becomes saturated with rain water, it dissolves or disintegrates and thereby enables the switch to actuate the window closing mechanism. But here too the quantity of rain which is required to dissolve the water soluble element is sufficient to cause damage to the inside of the convertible top automobile. This type of switch is also undesirable for the further reason that the water soluble element is usable but once and it must thereafter be replaced. A third type of rain-controlled switch used in the home depends upon electrolytic action for its operation. A soluble substance, such as salt, is employed to convert rain water to an electrolyte. The rain water then serves as a conductor for electric current and the circuit to the window closing mechanism is thereby closed. This switch is not, however, adaptable for use in a conventional convertible top automobile because its six volt circuit is not strong enough for the purpose.

In the present invention, the rain-controlled switch is provided with a delicately balanced contact member which responds to the weight of but a few drops of rain. The weight of the raindrops causes the contact member to tilt and thereby to engage a pair of fixed contact members in the electric system which controls the hydraulic mechanism for raising and lowering the convertible top. In the preferred form of this invention, the delicately balanced contact member comprises a pivotally mounted support, a contact bar on said support on one side of the pivot and a rain collecting pan on said support on the opposite side of said pivot. When a few drops of rain collect in the pan, said support is caused to tilt, the pan moving downwardly and the contact bar moving upwardly. The two contact members of the electrical system which controls the hydraulic mechanism are situated above the contact bar so that when the support tilts in the manner aforesaid, said contact bar will be swung upwardly into engagement with said fixed contact members.

The pivotally mounted support is also provided with an upwardly projecting post adjacent the contact bar. When rain falls and the support tilts, as above described, the upwardly extending post is caused to swing upwardly together with the contact bar. The contact bar bridges the gap between the two fixed contact members and thereby closes the circuit which controls the hydraulic mechanism. Said mechanism is thereby caused to operate and the convertible top is raised to closed position. The upwardly projecting post is so situated that it is disposed in the path of the convertible top and it is engaged by the convertible top when it reaches its closed position. This has the effect of causing the pivoted support to pivot in the opposite direction and its contact bar is thereby caused to disengage the two fixed contact members. The circuit to the hydraulic mechanism is now broken and operation of said mechanism ceases.

The switch mechanism thus described is provided with a locking or latching means for maintaining it in inoperative position so as to prevent the pivoted support from tilting when the automobile is driven over rough and uneven road surfaces. The catch or latch which holds the switch mechanism in inoperative position may be released when the automobile is parked so as to render the switch mechanism responsive to the weight of raindrops.

This switch mechanism is susceptible of many variations and modifications in design and construction. For example, only a single contact member may be provided for engagement with the movable contact bar. The contact member may be connected to one conductor and the contact bar may be connected to another conductor through the pivot on which it rocks. Engagement between the fixed contact member and the movable contact bar would close the circuit. The general arrangement of parts may also be changed, if desired. For example, the drawing shows a pivotally mounted support with a rain-collecting pan on one side of the pivot and the contact bar on the opposite side of the pivot. There is no reason why the rain-collecting pan and the contact bar may not be placed on the same side of the pivot. In such case, the fixed contact member or members would be placed on the same side of the pivot as the contact bar and the pan, and they would be located below the contact bar instead of above it.

Preferred forms of this invention are shown in the accompanying drawing in which:

Fig. 1 is a view of a typical convertible top automobile, showing one of the rain-controlled switches herein described and claimed installed thereon.

Fig. 2 is a vertical section through said rain-controlled switch.

Fig. 3 is a horizontal section on the line 3—3 of Fig. 2, said view being a top view of the switch with its cover plate removed to expose its working parts.

Fig. 4 is a top view of said rain-controlled switch, including a diagrammatic view of the electric circuit to which said switch is connected and which controls the hydraulic mechanism for raising and lowering the convertible top of the automobile.

Fig. 5 is a view of a second form of rain-controlled switch made in accordance with this invention.

The convertible top automobile 10 shown in Fig. 1 of the drawing is illustrative of convertible top automobiles generally. It is shown with its collapsible top 11 in lowered or open position. The rain-controlled switch 12 herein described and claimed is shown installed on the inside of the windshield supporting frame 13.

Figs. 2 and 3 show the details of the rain-controlled switch 12. This switch is inclosed in a casing 15 which is provided with brackets 16. These brackets are integral with the casing and they may be affixed to windshield frame 13 by means of screws 17. The casing and its brackets may be molded in a single mold of plastic material. A cover plate 18 is provided to cover the top of the casing and this cover plate may also be molded of plastics. Screws 19 may be employed to fasten the cover plate to the top of the casing. It will be seen that the casing has the shape of an open-topped box and the switch mechanism herein claimed is mounted within said box-like casing. It will also be seen that the cover plate 18 is provided with an opening 20 through which the rain may fall into the casing and more precisely, onto the switch mechanism in the casing. The cover plate is provided with another opening or hole 21 through which the upwardly extending post above mentioned projects.

A pair of posts 23 and 24 respectively are formed on the floor or bottom wall of the casing and they constitute the two supporting members on which the movable components of the switch are mounted. These two supporting posts serve as bearings for pin 25 and it will be noted that said supports are provided with aligned grooves 26 to accommodate said pin. Pivotally mounted on pin 26, between supporting posts 23 and 24, is a rocker 27. A rain-collecting pan 28 is formed at one end of said rocker. At the other end of the rocker, that is at the opposite side of the pin, is a recess 29 which accommodates a contact bar 30. Adjacent the contact bar is upwardly projecting post 31 which extends into the path of the collapsible top when said top is moved into closed position. A pair of fixed contact members 32 and 33 respectively are supported by the back wall of the casing and they project in parallel, horizontal lines immediately above the contact bar 30.

It will be noted that the rain-collecting pan is substantially co-extensive with opening 20 in the cover plate of the casing. Hence, when rain begins to fall, it enters the pan through said opening. Rocker 27 on which the pan is formed is normally delicately balanced on pin 25 but when the raindrops enter the pan the delicate balance is upset and the rocker is caused to pivot in clockwise direction as viewed in Fig. 2. This pivotal movement of the rocker brings contact bar 30 into engagement with the fixed contact members 32 and 33 above mentioned and the circuit shown in Fig. 4 is thereby closed. The closing of the circuit puts the hydraulic mechanism which actuates the convertible or collapsible top into operation and said top is thereby raised to its closed position. It will be understood that the collapsible top, and more specifically its forward or leading end, moves downwardly in the final stages of the closing operation. It is thereby caused to engage the top end of post 31 and to push said post downwardly until its bottom end strikes a boss 34 which is formed on the floor of the casing. This boss serves as a stop member to prevent the post from being pushed downwardly below a pre-determined point or level. Since post 31 is affixed to rocker 27, this downward movement of the post causes the rocker to swing in counter-clockwise direction as viewed in Fig. 2. Contact bar 30 is thereby moved out of engagement with fixed contact members 32 and 33 and the circuit which controls the hydraulic mechanism is thereby broken. Said hydraulic mechanism is thereby caused to cease operating and the collapsible top remains in closed position until such time as it is moved into open or lowered position by conventional means.

It will be noted that post 31 is provided with a catch member 35 which engages the cover plate 18 when the post is moved to its lowermost position. See the dotted lines in Fig. 2. The post is thus held between the cover plate and boss 34 until the catch is released. Since the post is fixed to the rocker, this has the effect of locking the rocker against pivotal movement on its supporting pin. The catch may be released by simply bending post 31 until its catch portion 35 clears the edge of the cover plate. This can be done because the post is made of relatively plastic or resilient material. The rocker, including its rain-collecting pan, may be molded of plastics. Post 31 may also constitute a plastic molding and it may be fastened to the rocker in the manner shown in Fig. 2 by means of a suitable cement. More particularly, the rocker is provided with a molded hole which accommodates the lower end of post 31 and said lower end of the post may be cemented to the walls of said hole.

Contact members 32 and 33 are threaded on their outwardly extending ends to receive a pair of nuts (not shown). In effect, therefore, these contact members constitute binding posts to which a pair of conductors 40 and 41 respectively may be connected. Conductor 40 is connected to the electric motor 45 of the mechanism and conductor 41 is connected to the valve control mechanism 46. A third conductor 42 connects said valve control mechanism to the storage battery of the automobile. The electric motor is connected to a conventional hydraulic pump and said pump is connected by means of tubes 47 and 47a to said valve control mechanism 46. Tubes 48 and 48a connect said valve control mechanism to the hydraulic cylinder 49 which raises and lowers the convertible top in conventional manner.

A two-way switch 43 is incorporated into conductor 40. More precisely, said conductor 40 is broken to accommodate said switch. When the switch arm bridges the gap between the broken ends of conductor 40, the circuit to the rain actuated switch above described is complete in the sense that the circuit is closed when contact bar 30 engages fixed contact members 32 and 33. When the switch arm is turned in clockwise direction as viewed in Fig. 4 until it bridges the gap between conductors 40 and 41, the rain actuated switch is cut out of the circuit which controls the hydraulic mechanism. Switch 43 therefore is the switch for allowing manual operation of the hydraulic mechanism and it is also the means whereby the rain actuated switch is brought into the circuit which controls said hydraulic mechanism. When the switch arm is in its neutral position as shown in Fig. 4, that is, it neither bridges the gap between the broken ends of conductor 40 nor does it bridge the gap between conductors 40 and 41, the hydraulic mechanism is rendered inoperative.

Turning now to the second form of this invention as shown in Fig. 5, it will be seen that it has a rocker 50 which corresponds to rocker 27 above described. The rocker is pivotally mounted on a fixed pivot 51. On one side of the pivot is the rain-collecting pan 52; on the other side of the pivot is contact bar 53. The contact bar has a hole formed in it to accommodate the pin. There is only one fixed contact member 54 instead of the two fixed contact members 32 and 33 of the first form of this invention. A conductor 55 is connected to fixed contact member 54 and said conductor corresponds to conductor 40 shown in Fig. 4. A second conductor 56 is connected to pin 51 and said latter conductor corresponds to conductor 41 of Fig. 4. A switch 57 is incorporated into conductor 55 in precisely the same manner as switch 43 is incorporated in conductor 40. When the rocker tilts in response to the weight of raindrops collected in pan 52, contact bar 53 engages contact member 54 and the circuit is closed.

It will be noted that a post 58, corresponding to post 31 is mounted on rocker 50. Post 58, however, is provided with a cap 59 and a compression spring 60 mounted within said cap. The cap is slidably mounted on the top of the post and the spring is mounted within the cap in such manner that its lower end bears against the top of the post and its upper end bears against the top of the cap. An inwardly extending flange on the cap engages an outwardly extending shoulder on the post to prevent the spring from pushing the cap off the post. It will be understood that this construction constitutes a resilient buffer or bumper between the convertible top of the automobile and the post.

I claim:

1. A rain-controlled switch of the character described, comprising a pivotally mounted support, a rain-collecting pan and a contact bar on said support, an upwardly projecting post mounted on said support on the opposite side of the pivot from the side where the rain-collecting pan is situated, a pair of contact members fixedly mounted adjacent said contact bar, said support being delicately balanced to maintain a state of equilibrium until the balance is upset by rain collecting in the pan, in which case the support is caused to pivot and thereby to bring the contact bar into engagement with the fixed contact members, said support being pivotally movable in the opposite direction in response to a downward force applied to said post to disengage the contact bar from the fixed contact members, and a catch on the upwardly projecting post to hold said post in a fixed position and thereby to maintain the pivotally mounted support in a fixed state of equilibrium.

2. A rain-controlled switch in accordance with claim 1, wherein the support is pivotally mounted in a casing and the contact members are fixedly secured to said casing, extending in part into said casing and in part out of said casing where they are threaded to serve as binding posts, said casing being provided with an opening above the rain-collecting pan to allow rain to enter said pan and being provided with a bracket for attachment to a suitable supporting surface.

WALTER R. STONE.

REFERENCES CITED

The following references are of record in the file of this patent:

UNITED STATES PATENTS

| Number | Name | Date |
| --- | --- | --- |
| 1,242,951 | Kole | Oct. 16, 1917 |
| 1,262,391 | Sabol | Apr. 9, 1918 |
| 2,293,447 | Shibelli | Aug. 18, 1942 |